(12) United States Patent
Kim et al.

(10) Patent No.: US 9,493,084 B2
(45) Date of Patent: Nov. 15, 2016

(54) SOURCE DEVICE AND METHOD FOR CONTROLLING MAGNETIC FIELD USING TWO SOURCE RESONATORS IN WIRELESS POWER TRANSMISSION SYSTEM

(75) Inventors: Ki Young Kim, Yongin-si (KR); Eun Seok Park, Yongin-si (KR); Jin Sung Choi, Gimpo-si (KR); Sang Wook Kwon, Seongnam-si (KR); Nam Yun Kim, Seoul (KR); Dong Zo Kim, Yongin-si (KR); Yun Kwon Park, Dongducheon-si (KR); Young Ho Ryu, Yongin-si (KR); Chang Wook Yoon, Yongin-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 13/592,595

(22) Filed: Aug. 23, 2012

(65) Prior Publication Data

US 2013/0049456 A1 Feb. 28, 2013

(30) Foreign Application Priority Data

Aug. 25, 2011 (KR) .................. 10-2011-0085000

(51) Int. Cl.
| | | |
|---|---|---|
| *B60L 1/00* | (2006.01) | |
| *H02J 17/00* | (2006.01) | |
| *B60L 11/18* | (2006.01) | |
| *H02J 5/00* | (2016.01) | |
| *H02J 7/02* | (2016.01) | |

(52) U.S. Cl.
CPC .......... *B60L 11/182* (2013.01); *B60L 11/1833* (2013.01); *B60L 2210/10* (2013.01); *B60L 2210/30* (2013.01); *B60L 2210/40* (2013.01); *B60L 2230/16* (2013.01); *H02J 5/005* (2013.01); *H02J 7/025* (2013.01); *Y02T 10/7005* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01)

(58) Field of Classification Search
None
See application file for complete search history.

(56) References Cited

U.S. PATENT DOCUMENTS

| | | | |
|---|---|---|---|
| 2001/0000960 A1* | 5/2001 | Dettloff | .......... 343/748 |
| 2010/0033021 A1 | 2/2010 | Bennett | |
| 2010/0079004 A1* | 4/2010 | Keefe | .............. 307/80 |

(Continued)

FOREIGN PATENT DOCUMENTS

| | | |
|---|---|---|
| JP | 2008-283789 A | 11/2008 |
| JP | 2009-164293 A | 7/2009 |
| JP | 2009-252970 A | 10/2009 |

(Continued)

*Primary Examiner* — Jared Fureman
*Assistant Examiner* — Aqeel Bukhari
(74) *Attorney, Agent, or Firm* — NSIP Law

(57) ABSTRACT

A source device and a method for controlling a magnetic field using two source resonators in a wireless power transmission system are provided. A device configured to control a magnetic field, includes resonators configured to form the magnetic field to transmit power to another device. The device further includes a magnetic field shape determining unit configured to determine a shape of the magnetic field. The device further includes a phase changing unit configured to change a phase of at least one of the resonators to form the magnetic field in the determined shape.

14 Claims, 13 Drawing Sheets

(56) References Cited

U.S. PATENT DOCUMENTS

2010/0311494 A1* 12/2010 Miller .................. A63F 1/18
463/22
2011/0043327 A1* 2/2011 Baarman et al. .............. 340/5.8

FOREIGN PATENT DOCUMENTS

| KR | 10-0792308 | 12/2007 |
| KR | 10-2009-0023540 A | 3/2009 |
| KR | 10-2010-0098715 | 9/2010 |

* cited by examiner

⟶ INPUT CURRENT
▸ INDUCED CURRENT

SOURCE DEVICE AND METHOD FOR CONTROLLING MAGNETIC FIELD USING TWO SOURCE RESONATORS IN WIRELESS POWER TRANSMISSION SYSTEM

CROSS-REFERENCE TO RELATED APPLICATION(S)

This application claims the benefit under 35 U.S.C. §119 (a) of Korean Patent Application No. 10-2011-0085000, filed on Aug. 25, 2011, in the Korean Intellectual Property Office, the entire disclosure of which is incorporated herein by reference for all purposes.

BACKGROUND

1. Field

The following description relates to a source device and a method for controlling a shape of a magnetic field in a wireless power transmission system.

2. Description of Related Art

A wireless power refers to energy that is transferred from a wireless power transmitter to a wireless power receiver through magnetic coupling. Accordingly, a wireless power transmission system includes a source device to wirelessly transmit a power, and a target device to wirelessly receive a power. The source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator. According to a characteristic of a wireless environment, the target device may be positioned around the source device. However, since the source device may not control the magnetic coupling of the source device based on a position of the target device, a transmission rate between the source resonator and the target resonator may be relatively low depending on the position of the target device.

SUMMARY

In one general aspect, there is provided a device configured to control a magnetic field, the device including resonators configured to form the magnetic field to transmit power to another device. The device further includes a magnetic field shape determining unit configured to determine a shape of the magnetic field. The device further includes a phase changing unit configured to change a phase of at least one of the resonators to form the magnetic field in the determined shape.

The magnetic field shape determining unit may be further configured to determine the shape of the magnetic field based on a user request.

The device may further include a target verification unit configured to verify a number of devices to which the power is to be transmitted, and positions of the devices. The magnetic field shape determining unit may be further configured to determine the shape of the magnetic field based on the number of the devices and the positions of the devices to optimize transmission rates between the device and the devices, respectively.

The phase changing unit may be further configured to set a phase difference between the resonators to zero degrees if the determined shape corresponds to a shape in which a magnitude of the magnetic field between the resonators is at a maximum.

The phase changing unit may be further configured to set a phase difference between the resonators to 180 degrees if the determined shape corresponds to a shape in which a magnitude of the magnetic field between the resonators is at a minimum and a magnitude of the magnetic field outside of the resonators is relatively large.

The phase changing unit may be further configured to set a phase difference between the resonators to be between zero degrees and 180 degrees based on the determined shape.

The phase changing unit may be further configured to delay transfer of a current to be input into the at least one of the resonators to change the phase.

In another general aspect, there is provided a device configured to control a magnetic field, the device including at least two resonators configured to form the magnetic field to transmit power to devices. The device further includes a target verification unit configured to verify a number of the devices and positions of the devices. The device further includes a magnetic field shape determining unit configured to determine a shape of the magnetic field based on the number of the devices and the positions of the devices to optimize transmission rates between the device and the devices, respectively. The device further includes a phase changing unit configured to change a phase of at least one of the at least two resonators to form the magnetic field in the determined shape.

In still another general aspect, there is provided a method of controlling, by a device, a magnetic field, the method including determining a shape of the magnetic field to be formed by resonators to transmit power to another device. The method further includes changing a phase of at least one of the resonators to form the magnetic field in the determined shape.

The determining may include determining the shape of the magnetic field based on a user request.

The method may further include verifying a number of devices to which the power is to be transmitted, and positions of the devices. The determining may include determining the shape of the magnetic field based on the number of the devices and the positions of the devices to optimize transmission rates between the device and the devices, respectively.

The changing may include setting a phase difference between the resonators to zero degrees if the determined shape corresponds to a shape in which a magnitude of the magnetic field between the resonators is at a maximum.

The changing may include setting a phase difference between the resonators to 180 degrees if the determined shape corresponds to a shape in which a magnitude of the magnetic field between the resonators is at a minimum and a magnitude of the magnetic field outside of the resonators is relatively large.

The changing may include setting a phase difference between the resonators to be between zero degrees and 180 degrees based on the determined shape.

The changing may include delaying transfer of a current to be input into the at least one of the resonators to change the phase.

A non-transitory computer-readable storage medium may store a program including instructions to cause a computer to perform the method.

In yet another general aspect, there is provided a method of controlling, by a device, a magnetic field, the method including verifying a number of devices to which power is to be transmitted, and positions of the devices. The method further includes determining a shape of the magnetic field to be formed by at least two resonators to transmit the power to the devices based on the number of the devices and the positions of the devices to optimize transmission rates between the device and the devices, respectively. The method further includes changing a phase of at least one of the at least two resonators to form the magnetic field in the determined shape.

A non-transitory computer-readable storage medium may store a program including instructions to cause a computer to perform the method.

In another general aspect, there is provided an electric vehicle including resonators configured to form a magnetic field to transmit power to another electric vehicle. The electric vehicle further includes a magnetic field shape determining unit configured to determine a shape of the magnetic field. The electric vehicle further includes a phase changing unit configured to change a phase of at least one of the resonators to form the magnetic field in the determined shape.

The electric vehicle may further include a target verification unit configured to verify a number of electric vehicles to which the power is to be transmitted, and positions of the electric vehicles. The magnetic field shape determining unit may be further configured to determine the shape of the magnetic field based on the number of the electric vehicles and the positions of the electric vehicles to optimize transmission rates between the electric vehicle and the electric vehicles, respectively.

Other features and aspects will be apparent from the following detailed description, the drawings, and the claims.

Figure 1:
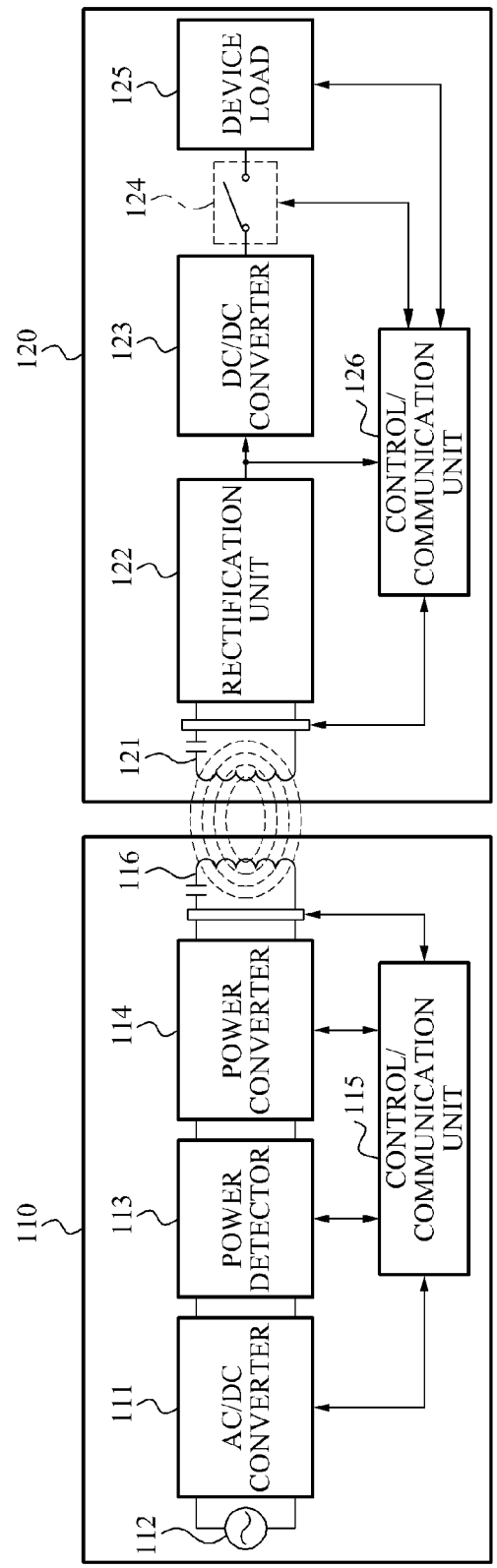
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example of a wireless power transmission system. Referring to FIG. 1, the wireless power transmission and charging system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a device load 125, and a control/communication unit 126. The target device 120 may further include a communication module (not shown). In this example, the communication module may include a communication circuit, for example, a Bluetooth circuit, a wireless local area network (WLAN) circuit, and/or any other communication circuit known to one of ordinary skill in the art.

The AC/DC converter 111 generates a DC voltage by rectifying an AC voltage having a frequency of tens of hertz (Hz) output from a power supply 112. The AC/DC converter 111 may output a DC voltage having a predetermined level, or may output a DC voltage having an adjustable level by the control/communication unit 115.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates a power by converting the DC voltage output from the AC/DC converter 111 to an AC voltage using a switching pulse signal having a frequency of a few kilohertz (kHz) to tens of megahertz (MHz). In other words, the power converter 114 converts a DC voltage supplied to a power amplifier to an AC voltage using a reference resonance frequency $F_{Ref}$, and generates a communication power to be used for communication, a charging power to be used for charging that may be used in a plurality of target devices, a tracking power to be used for tracking the resonance frequency, and/or an operation power to be used for operation of the target devices. Each of the communication power and the tracking power may be, for example, a low power of 0.1 to 1 milliwatts (mW) that may be used by a target device to perform communication, and each of the charging power and the operation power may be, for example, a high power of 1 mW to 200 Watts (W) that may be consumed by a device load of a target device. Also, the power converter 114 may generate the operation power based on a power transmission efficiency and a dissipation power of the target device 120.

In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The control/communication unit 115 determines the resonance frequency at which a transmission efficiency for the wireless power may be greater than or equal to a predetermined value. The control/communication unit 115 further performs power control to maintain an amount of power received by the target device 120 within a predetermined range.

The control/communication unit 115 may detect a reflected wave of the communication power, the charging power, the tracking power, and/or the operation power, and may detect mismatching between the target resonator 121 and the source resonator 116 based on the detected reflected wave. The control/communication unit 115 may detect the mismatching by detecting an envelope of the reflected wave, or by detecting an amount of a power of the reflected wave.

Also, the control/communication unit 115 may control a frequency of the switching pulse signal used by the power converter 114. By controlling the switching pulse signal used by the power converter 114, the control/communication unit 115 may generate a modulation signal to be transmitted to the target device 120. In other words, the control/communication unit 115 may transmit various messages to the target device 120 via in-band communication. Additionally, the control/communication unit 115 may detect a reflected wave, and may demodulate a signal received from the target device 120 through an envelope of the reflected wave.

The control/communication unit 115 may generate a modulation signal for in-band communication using various schemes. To generate a modulation signal, the control/communication unit 115 may turn on or off the switching pulse signal used by the power converter 114, or may perform delta-sigma modulation. Additionally, the control/communication unit 115 may generate a pulse-width modulation (PWM) signal having a predetermined envelope.

The control/communication unit 115 may perform out-of-band communication using a communication channel. The control/communication unit 115 may include a communication module, such as a ZigBee module, a Bluetooth module, or any other communication module, that the control/communication unit 115 may use to perform the out-of-band communication. The control/communication unit 115 may transmit or receive data to or from the target device 120 via the out-of-band communication.

The source resonator 116 transfers electromagnetic energy, such as the communication power, the charging power, the tracking power, and/or the operation power, to the target resonator 121 via a magnetic coupling with the target resonator 121.

The target resonator 121 receives the electromagnetic energy, such as the communication power, the charging power, the tracking power, and/or the operation power, from the source resonator 116 via a magnetic coupling with the source resonator 116. Additionally, the target resonator 121 receives various messages from the source device 110 via the in-band communication.

The rectification unit 122 generates a DC voltage by rectifying an AC voltage received by the target resonator 121.

The DC/DC converter 123 adjusts a level of the DC voltage output from the rectification unit 122 based on a voltage rating of the device load 125. For example, the DC/DC converter 123 may adjust the level of the DC voltage output from the rectification unit 122 to a level in a range from 3 volts (V) to 10 V.

The switch unit 124 is turned on or off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The device load 125 may include a battery. The device load 125 may charge the battery using the DC voltage output from the DC/DC converter 123.

The control/communication unit 126 transmits, to the source device 110, information about an amount of the received operation power, information about a dissipation power of the device load 125, and information about an amount of the received tracking power. In this example, the amount of the received operation power may be maintained within the predetermined range. The control/communication unit 126 further detects information about a charging state of the battery for charging, and transmits the information about the charging state to the source device 110. In this example, the information about the charging state may correspond to an amount of current flowing through the battery, and a voltage applied to the battery.

The control/communication unit 126 may perform in-band communication for transmitting or receiving data using a resonance frequency by demodulating a received signal obtained by detecting a signal between the target resonator 121 and the rectification unit 122, or by detecting an output signal of the rectification unit 122. In other words, the control/communication unit 126 may demodulate a message received via the in-band communication.

Additionally, the control/communication unit 126 may adjust an impedance of the target resonator 121 to modulate a signal to be transmitted to the source device 110. Specifically, the control/communication unit 126 may modulate the signal to be transmitted to the source device 110 by turning the switch unit 124 on and off. For example, the control/communication unit 126 may increase the impedance of the target resonator by turning the switch unit 124 off so that a reflected wave will be detected by the control/communication unit 115 of the source device 110. In this example, depending on whether the reflected wave is detected, the control/communication unit 115 of the source device 110 will detect a binary number "0" or "1."

The control/communication unit 126 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The control/communication unit 126 may also perform an out-of-band communication using a communication channel. The control/communication unit 126 may include a communication module, such as a ZigBee module, a Bluetooth module, or any other communication module known in the art, that the control/communication unit 126 may use to transmit or receive data to or from the source device 110 via the out-of-band communication.

Figure 2:
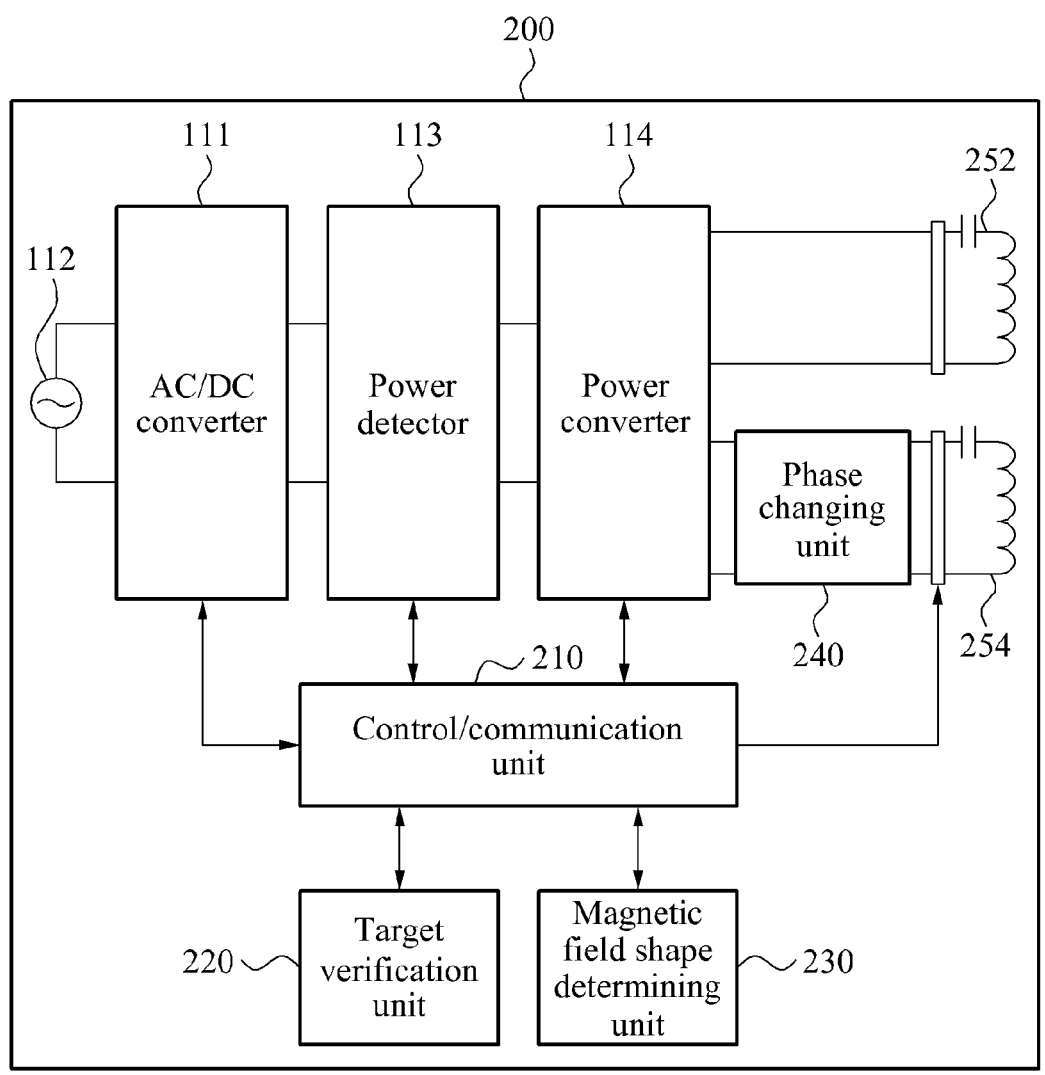
FIG. 2 is a diagram illustrating an example of a source device configured to control a magnetic field in a wireless power transmission system.

FIG. 2 is a diagram illustrating an example of a source device 200 configured to control a magnetic field in a wireless power transmission system. Referring to FIG. 2, the source device 200 includes an AC/DC converter 111, a power detector 113, a power converter 114, a control/communication unit 210, a target verification unit 220, a magnetic field shape determining unit 230, a phase changing unit 240, and source resonators 252 and 254.

The AC/DC converter 111, the power detector 113, and the power converter 114 of FIG. 2 are identical to the AC/DC converter 111, the power detector 113, and the power converter 114 of FIG. 1. Thus, detailed descriptions will be omitted for conciseness.

The target verification unit 220 verifies a number of target devices and positions of the target devices to which a wireless power is to be transmitted. To verify the number of the target devices and the positions of the target devices, the target verification unit 220 may perform communication with the target devices when the target devices request, from the source device 200, the wireless power. Additionally or alternatively, to verify the number of the target devices and the positions of the target devices, the target verification unit 220 may use a sensor to sense a target device and/or a resonance characteristic used to supply the wireless power.

The magnetic field shape determining unit 230 determines a shape of a magnetic field formed by the source resonators 252 and 254. The magnetic field shape determining unit 230 may determine the shape of the magnetic field based on a user request. Also, the magnetic field determining unit 230 may determine the shape of the magnetic field based on the number of the target devices and the positions of the target devices to optimize transmission rates between the source device 200 and the target devices, respectively. For example, if all or most of the target devices are positioned between the source resonators 252 and 254, the shape of the magnetic field is determined to be a shape in which a magnitude of the magnetic field between the source resonators 252 and 254 is at a maximum. The transmission rates between the source device 200 and the target devices may refer to transmission efficiencies of power transmitted from the source device 200 to the target devices, respectively, or amounts of the power received by the target devices.

The phase changing unit 240 changes a phase of a current to be input into the source resonator 254 to form the magnetic field in the determined shape. In this example, the phase changing unit 240 may delay transfer of the current to be input into the source resonator 254 to change the phase of the current. Examples of a shape of a magnetic field formed by the phase changing unit 240 will be described with reference to FIGS. 3 through 5.

Figure 3:
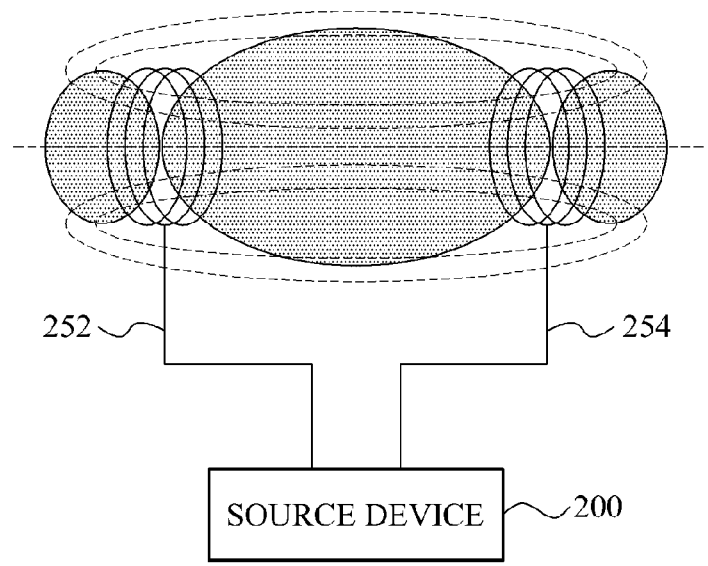
FIG. 3 is a diagram illustrating an example of a source device controlling a magnetic field.

FIG. 3 is a diagram illustrating an example of the source device 200 controlling a magnetic field. Referring to FIG. 3, a shape of the magnetic field corresponds to a shape in which a magnitude of the magnetic field between the source resonators 252 and 254 is at a maximum. In this example, the phase changing unit 240 changes a phase of a current to be input into the source resonator 254 to set a phase difference between the source resonators 252 and 254 to zero degrees.

Figure 4:
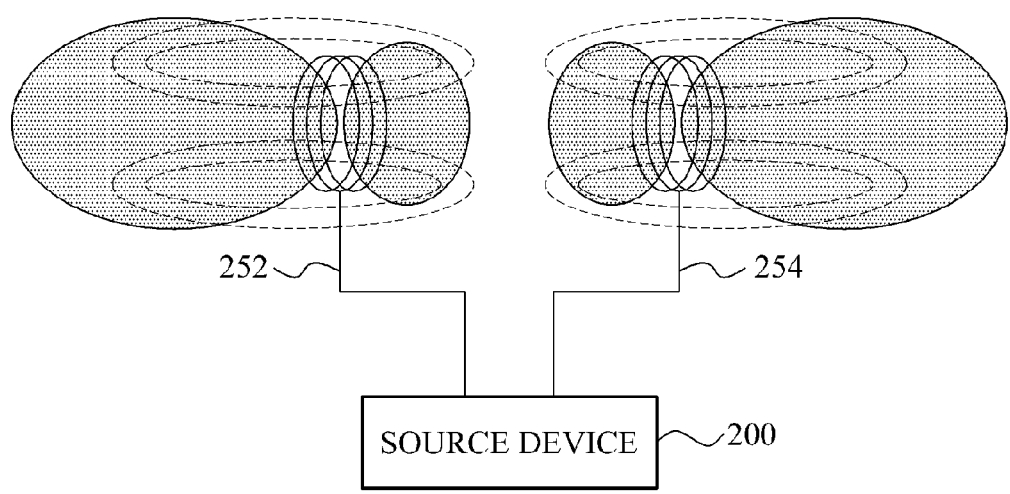
FIG. 4 is a diagram illustrating another example of a source device controlling a magnetic field.

FIG. 4 is a diagram illustrating another example of the source device 200 controlling a magnetic field. Referring to FIG. 4, a shape of the magnetic field corresponds to a shape in which a magnitude of the magnetic field between the source resonators 252 and 254 is at a minimum, and a magnitude of the magnetic field outside of the source resonators 252 and 254 is relatively large. In this example, the phase changing unit 240 changes a phase of a current to be input into the source resonator 254 to set a phase difference between the source resonators 252 and 254 to 180 degrees.

Figure 5:
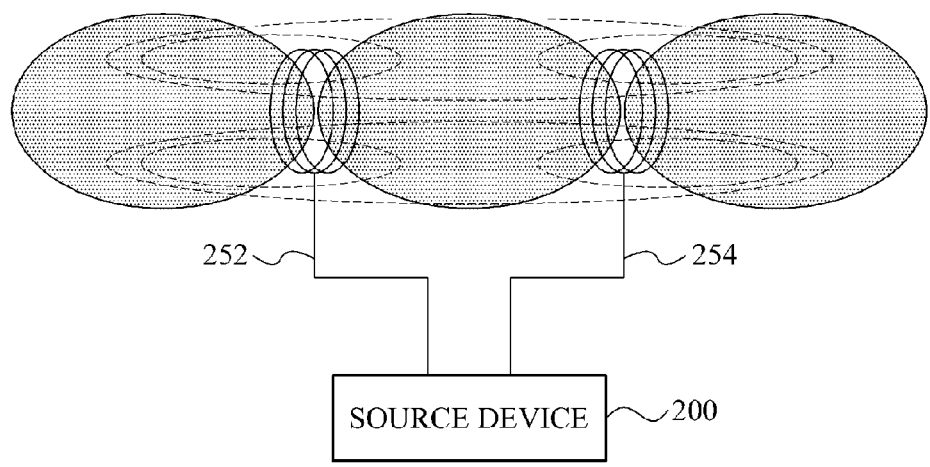
FIG. 5 is a diagram illustrating still another example of a source device controlling a magnetic field.

FIG. 5 is a diagram illustrating still another example of the source device 200 controlling a magnetic field. Referring to FIG. 5, a shape of the magnetic field corresponds to a shape in which the magnetic field is uniformly distributed between the source resonators 252 and 254, and outside of the source resonators 252 and 254. The distribution of the magnetic field may be changed based on a phase difference between the source resonators 252 and 254. In this example, the phase changing unit 240 changes a phase of a current to be input into the source resonator 254 based on a determined shape of the magnetic field to set the phase difference between the source resonators 252 and 254 to be between zero degrees and 180 degrees.

Referring again to FIG. 2, the source resonators 252 and 254 form the magnetic field between the source resonators 252 and 254. The source resonators 252 and 254 further transfer electromagnetic energy to a target resonator.

The control/communication unit 210 performs functions of the control/communication unit 115 of FIG. 1. Additionally, the control/communication unit 210 may perform functions of the target verification unit 220 and the magnetic field shape determining unit 230. In FIG. 2, the control/communication unit 210, the target verification unit 220, and the magnetic field shape determining unit 230 are separately illustrated to individually describe the functions of the control/communication unit 210, the target verification unit 220, and the magnetic field shape determining unit 230. Accordingly, the control/communication unit 210 may include at least one processor configured to perform all of the functions of the target verification unit 220 and the magnetic field shape determining unit 230, or to perform only a portion of the functions of the target verification unit 220 and the magnetic field shape determining unit 230.

Figure 6:
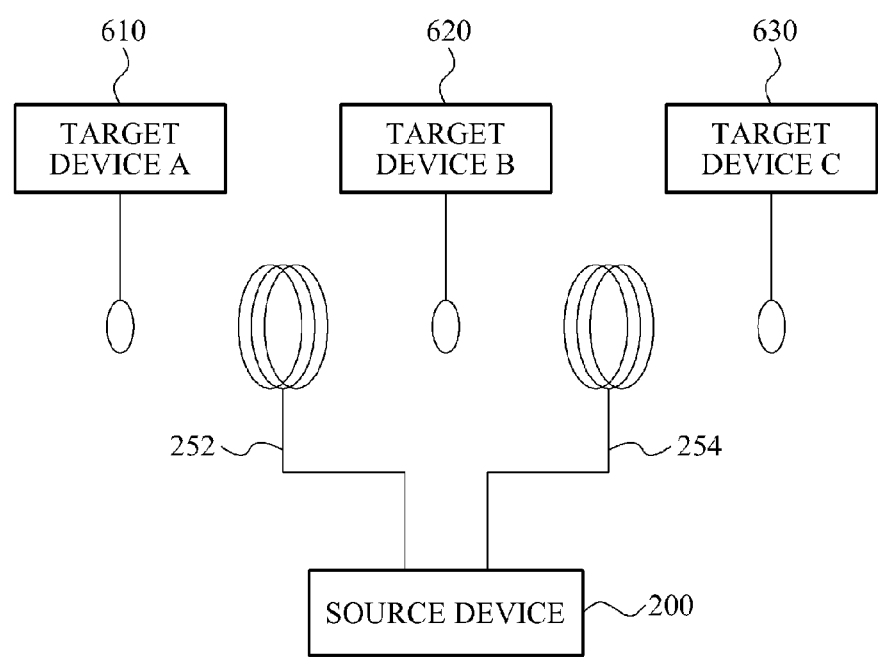
FIG. 6 is a diagram illustrating an example of a source device verifying transmission rates of target devices when a magnetic field is controlled by the source device.

FIG. 6 is a diagram illustrating an example of the source device 200 verifying transmission rates of target devices 610, 620, and 630 when a magnetic field is controlled by the source device 200. Referring to FIG. 6, a wireless power transmission system includes the source device 200 including the source resonators 252 and 254, the target device A 610 and the target device C 630 that are positioned outside the source resonators 252 and 254, and the target device B 620 that is positioned between the source resonators 252 and 254.

Each of the target device A 610, the target device B 620, and the target device C 630 receive a power from the source device 200 at each of their respective positions. In this example, an amount of the power received by each of the target device A 610, the target device B 620, and the target device C 630 may be changed based on a transmission rate, which may be changed based on a shape of the magnetic field.

The source device 200 determines the shape of the magnetic field based on the positions of the target device A 610, the target device B 620, and the target device C 630, and changes a phase difference between the source resonators 252 and 254 to change or form the shape of the magnetic field. For example, if the source device 200 determines the shape of the magnetic field to be the shape as shown in FIG. 3, the source device 200 sets the phase difference between the source resonators 252 and 254 to zero degrees. In this example, transmission rates of the target device A 610, the target device B 620, and the target device C 630 are shown in FIG. 7, respectively.

Figure 7:
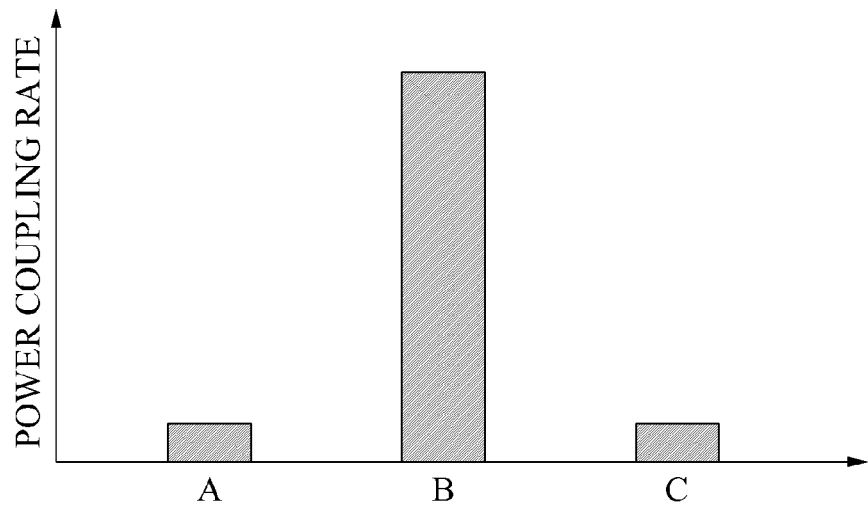
FIG. 7 is a graph illustrating an example of transmission rates of target devices when a magnetic field is controlled by a source device.

FIG. 7 is a graph illustrating an example of the transmission rates of the target devices 610, 620, and 630 when a magnetic field is controlled by the source device 200. The transmission rate between a source resonator and a target resonator is determined based on a power coupling rate. Accordingly, the terms "power coupling rate" and "transmission rate" may be used to denote the same meaning, and may be used interchangeably herein. Referring to FIG. 7, the transmission rate of the target device B 620 that is positioned between the source resonators 252 and 254 is maximized, and the transmission rates of the target device A 610 and the target device C 630 that are positioned outside the source resonators 252 and 254 are minimized.

Referring again to FIG. 6, in another example, if the source device 200 determines the shape of the magnetic field to be the shape as shown in FIG. 4, the source device 200 sets the phase difference between the source resonators 252 and 254 to 180 degrees. In this example, transmission rates of the target device A 610, the target device B 620, and the target device C 630 are shown in FIG. 8, respectively.

Figure 8:
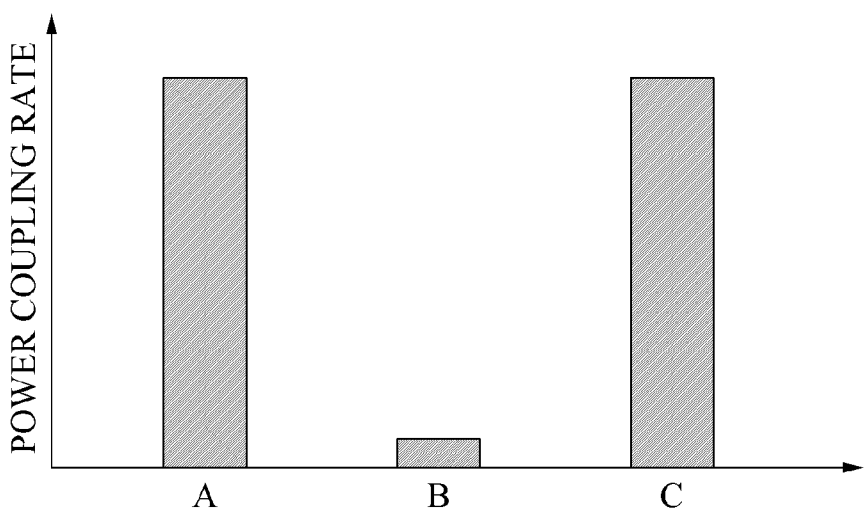
FIG. 8 is a graph illustrating another example of transmission rates of target devices when a magnetic field is controlled by a source device.

FIG. 8 is a graph illustrating another example of the transmission rates of the target devices 610, 620, and 630 when a magnetic field is controlled by the source device 200. Referring to FIG. 8, the transmission rate of the target device B 620 that is positioned between the source resonators 252 and 254 is minimized, and the transmission rates of the target device A 610 and the target device C 630 that are positioned outside the source resonators 252 and 254 are maximized.

Referring again to FIG. 6, in still another example, if the source device 200 sets the phase difference between the source resonators 252 and 254 to be between zero degrees and 180 degrees, the shape of the magnetic field may be formed as shown in FIG. 5, and the shape of the magnetic field may be changed based on the phase difference. In this example, transmission rates of the target device A 610, the target device B 620, and the target device C 630 may be changed based on the phase difference between the source resonators 252 and 254 as shown in FIG. 9, respectively.

Figure 9:
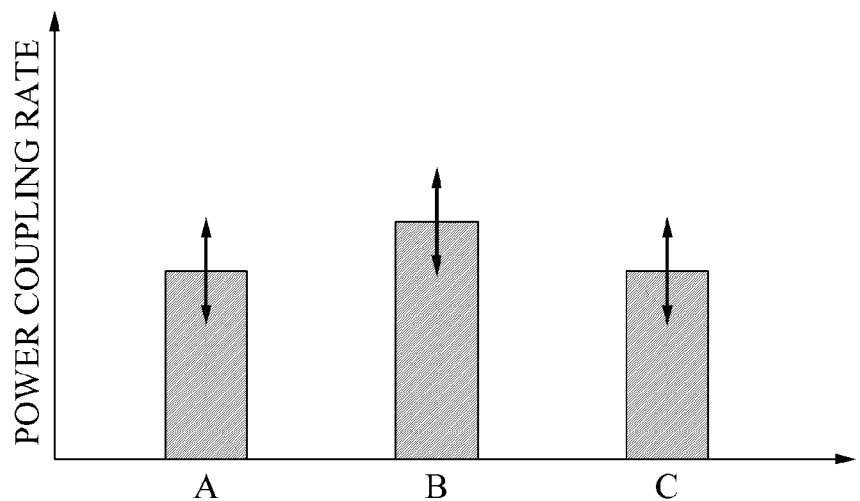
FIG. 9 is a graph illustrating still another example of transmission rates of target devices when a magnetic field is controlled by a source device.

FIG. 9 is a graph illustrating still another example of the transmission rates of the target devices 610, 620, and 630 when a magnetic field is controlled by the source device 200. Referring to FIG. 9, the transmission rate of the target device B 620 that is positioned between the source resonators 252 and 254 may become greater as the phase difference between the source resonators 252 and 254 becomes closer to zero degrees. The transmission rates of the target device A 610 and the target device C 630 that are positioned outside the source resonators 252 and 254 may become greater as the phase difference between the source resonators 252 and 254 becomes closer to 180 degrees. In this example, the transmission rate of the target device B 620 and the transmission rates of the target device A 610 and the target device C 630 include a trade-off relationship.

Figure 10:
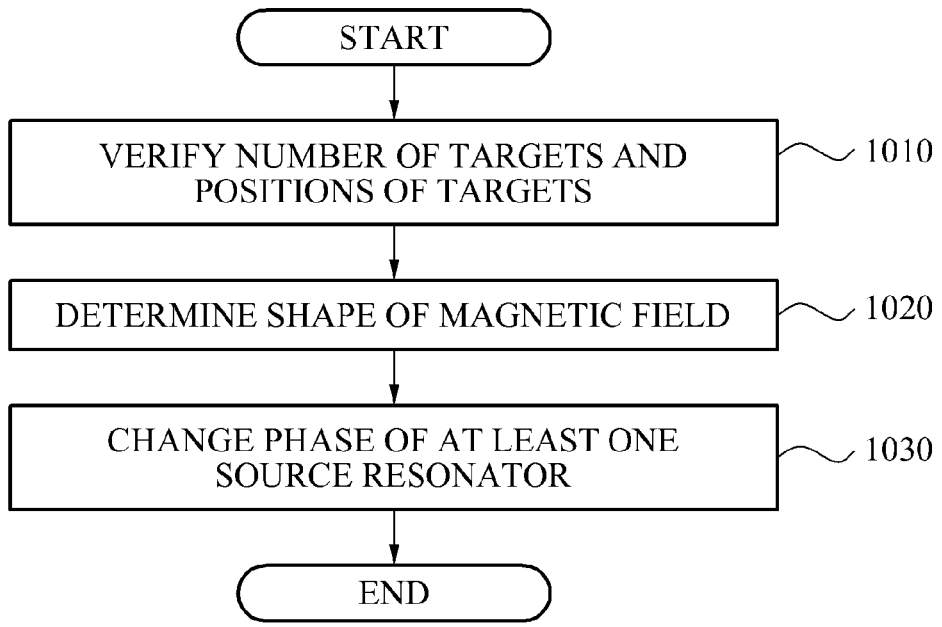
FIG. 10 is a flowchart illustrating an example of a method of controlling, by a source device, a magnetic field.

FIG. 10 is a flowchart illustrating an example of a method of controlling, by a source device, a magnetic field. Referring to FIG. 10, in operation 1010, the source device verifies a number of target devices and positions of the target devices to which a wireless power is to be transmitted.

In operation 1020, the source device determines a shape of a magnetic field formed by two source resonators of the source device based on, e.g., the number of the target devices and the positions of the target devices to optimize transmission rates between the source device and the target devices, respectively. In operation 1030, the source device changes a phase of at least one of the two source resonators to form the magnetic field in the determined shape.

In the following description, the term "resonator" used in the discussion of FIGS. 11A through 13B refers to both a source resonator and a target resonator.

Figure 11A:
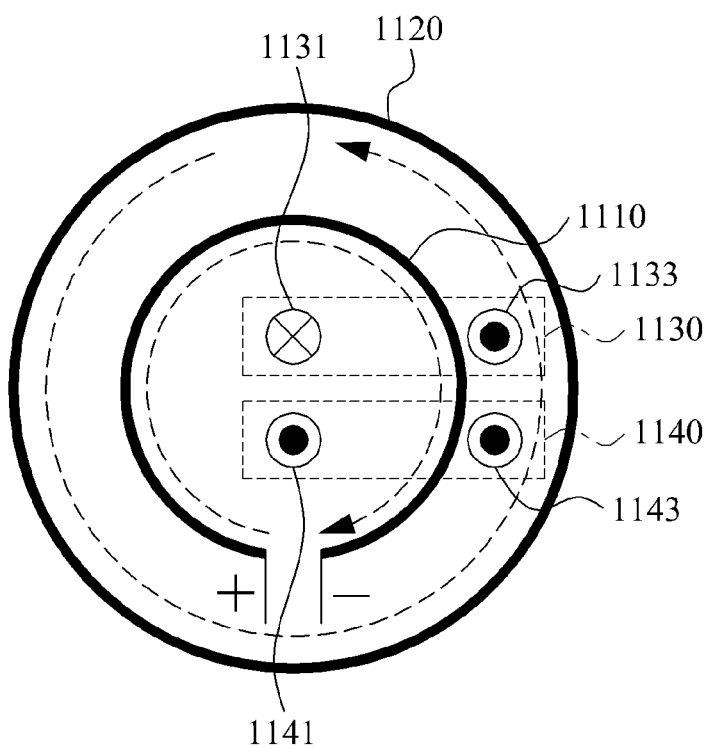
FIGS. 11A and 11B are diagrams illustrating examples of a distribution of a magnetic field in a feeder and a resonator of a wireless power transmitter.
Figure 11B:
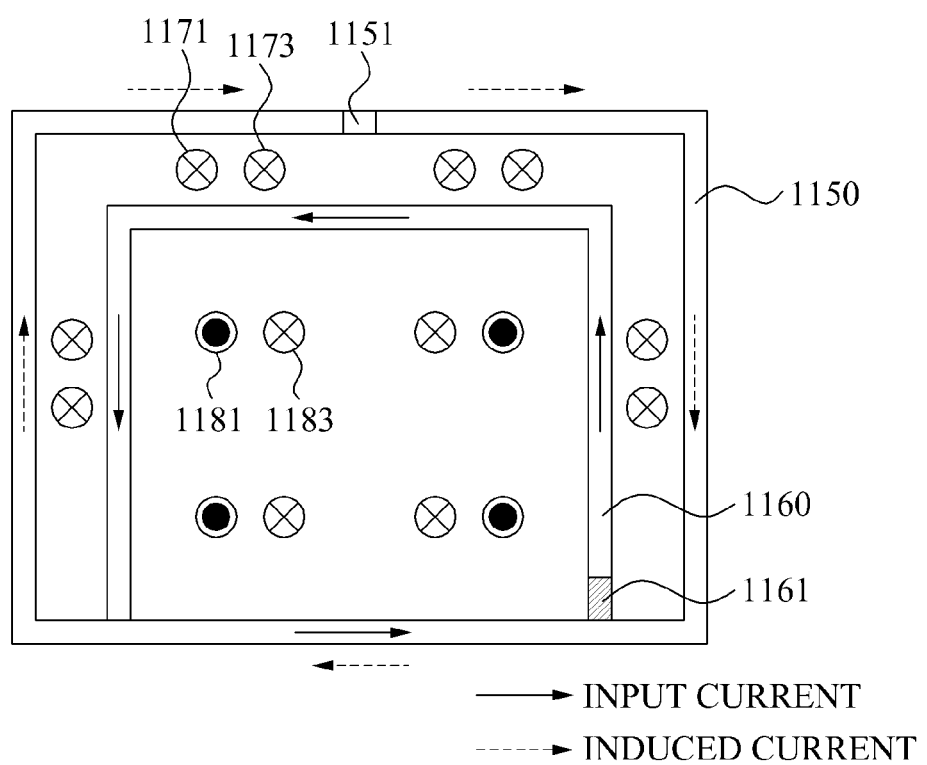

FIGS. 11A and 11B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 11A illustrates an example of a structure of a wireless power transmitter in which a feeder 1110 and a resonator 1120 do not have a common ground. Referring to FIG. 11A, as an input current flows into a feeder 1110 through a terminal labeled "+" and out of the feeder 1110 through a terminal labeled "−", a magnetic field 1130 is formed by the input current. A direction 1131 of the magnetic field 1130 inside the feeder 1110 is into the plane of FIG. 11A, and has a phase that is opposite to a phase of a direction 1133 of the magnetic field 1130 outside the feeder 1110. The magnetic field 1130 formed by the feeder 1110 induces a current to flow in a resonator 1120. The direction of the induced current in the resonator 1120 is opposite to a direction of the input current in the feeder 1110 as indicated by the dashed arrows in FIG. 11A.

The induced current in the resonator 1120 forms a magnetic field 1140. Directions of the magnetic field 1140 are the same at all positions inside the resonator 1120. Accordingly, a direction 1141 of the magnetic field 1140 formed by the resonator 1120 inside the feeder 1110 has the same phase as a direction 1143 of the magnetic field 1140 formed by the resonator 1120 outside the feeder 1110.

Consequently, when the magnetic field 1130 formed by the feeder 1110 and the magnetic field 1140 formed by the resonator 1120 are combined, a strength of the total magnetic field inside the resonator 1120 decreases inside the feeder 1110 and increases outside the feeder 1110. In an example in which power is supplied to the resonator 1120 through the feeder 1110 configured as illustrated in FIG. 11A, the strength of the total magnetic field decreases in the center of the resonator 1120, but increases outside the resonator 1120. In another example in which a magnetic field is randomly distributed in the resonator 1120, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 11B illustrates an example of a structure of a wireless power transmitter in which a resonator 1150 and a feeder 1160 have a common ground. The resonator 1150 includes a capacitor 1151. The feeder 1160 receives a radio frequency (RF) signal via a port 1161. When the RF signal is input to the feeder 1160, an input current is generated in the feeder 1160. The input current flowing in the feeder 1160 forms a magnetic field, and a current is induced in the resonator 1150 by the magnetic field. Additionally, another magnetic field is formed by the induced current flowing in the resonator 1150. In this example, a direction of the input current flowing in the feeder 1160 has a phase opposite to a phase of a direction of the induced current flowing in the resonator 1150. Accordingly, in a region between the resonator 1150 and the feeder 1160, a direction 1171 of the magnetic field formed by the input current has the same phase as a direction 1173 of the magnetic field formed by the induced current, and thus the strength of the total magnetic field increases in the region between the resonator 1150 and the feeder 1160. Conversely, inside the feeder 1160, a direction 1181 of the magnetic field formed by the input current has a phase opposite to a phase of a direction 1183 of the magnetic field formed by the induced current, and thus the strength of the total magnetic field decreases inside the feeder 1160. Therefore, the strength of the total magnetic field decreases in the center of the resonator 1150, but increases outside the resonator 1150.

An input impedance may be adjusted by adjusting an internal area of the feeder 1160. The input impedance refers to an impedance viewed in a direction from the feeder 1160 to the resonator 1150. When the internal area of the feeder 1160 is increased, the input impedance is increased. Conversely, when the internal area of the feeder 1160 is decreased, the input impedance is decreased. Because the magnetic field is randomly distributed in the resonator 1150 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 12A:
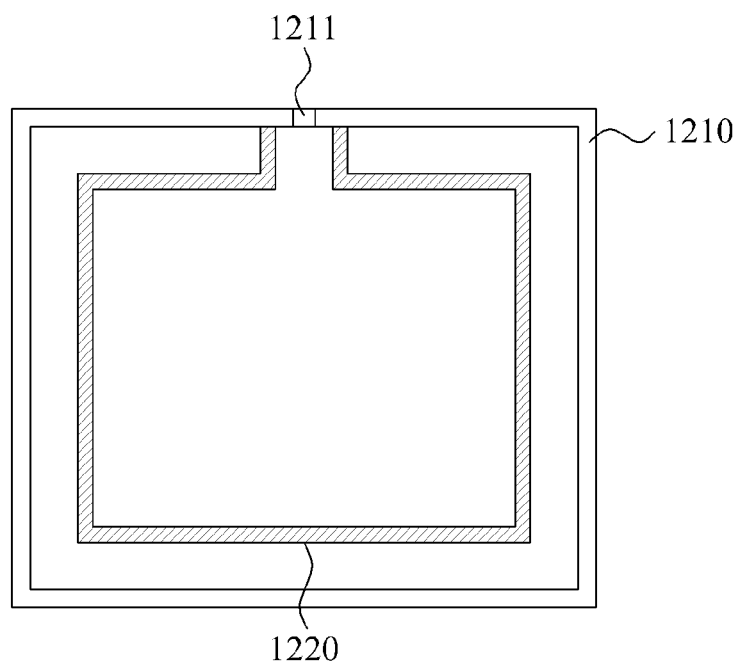
FIGS. 12A and 12B are diagrams illustrating an example of a resonator and a feeder of a wireless power transmitter.
Figure 12B:
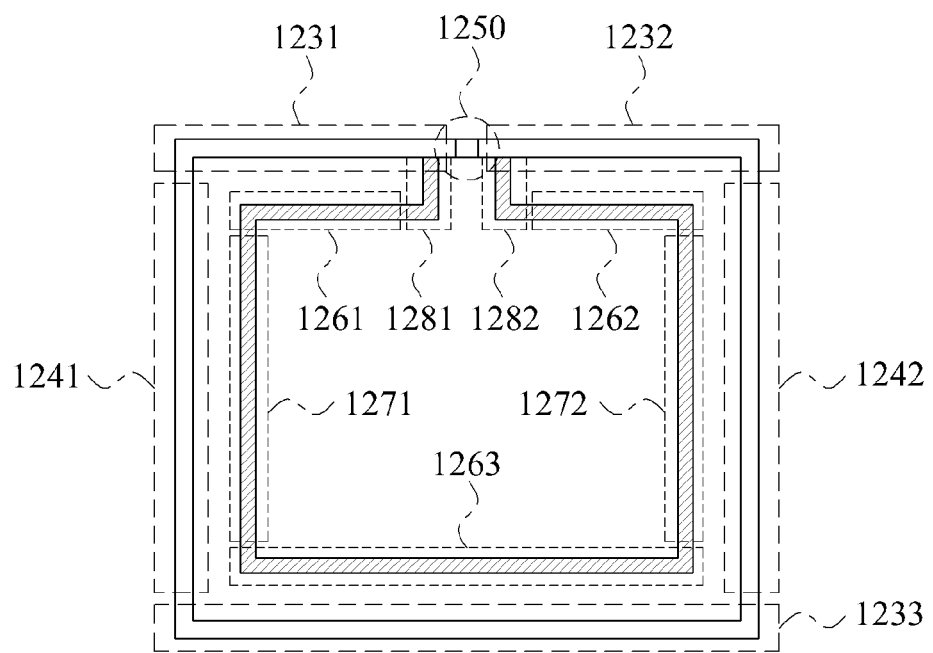

FIGS. 12A and 12B are diagrams illustrating an example of a resonator and a feeder of a wireless power transmitter. Referring to FIG. 12A, the wireless power transmitter includes a resonator 1210 and a feeder 1220. The resonator 1210 further includes a capacitor 1211. The feeder 1220 is electrically connected to both ends of the capacitor 1211.

FIG. 12B illustrates, in greater detail, a structure of the wireless power transmitter of FIG. 12A. The resonator 1210 includes a first transmission line (not identified by a reference numeral in FIG. 12B, but formed by various elements in FIG. 12B as discussed below), a first conductor 1241, a second conductor 1242, and at least one capacitor 1250.

The capacitor 1250 is inserted in series between a first signal conducting portion 1231 and a second signal conducting portion 1232, causing an electric field to be confined within the capacitor 1250. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 12B is separated into two portions that will be referred to as the first signal conducting portion 1231 and the second signal conducting portion 1232. A conductor disposed in a lower portion of the first transmission line in FIG. 12B will be referred to as a first ground conducting portion 1233.

As illustrated in FIG. 12B, the resonator 1210 has a generally two-dimensional (2D) structure. The first transmission line includes the first signal conducting portion 1231 and the second signal conducting portion 1232 in the upper portion of the first transmission line, and includes the first ground conducting portion 1233 in the lower portion of the first transmission line. The first signal conducting portion 1231 and the second signal conducting portion 1232 are disposed to face the first ground conducting portion 1233. A current flows through the first signal conducting portion 1231 and the second signal conducting portion 1232.

One end of the first signal conducting portion 1231 is connected to one end of the first conductor 1241, the other end of the first signal conducting portion 1231 is connected to the capacitor 1250, and the other end of the first conductor 1241 is connected to one end of the first ground conducting portion 1233. One end of the second signal conducting portion 1232 is connected to one end of the second conductor 1242, the other end of the second signal conducting portion 1232 is connected to the other end of the capacitor 1250, and the other end of the second conductor 1242 is connected to the other end of the ground conducting portion 1233. Accordingly, the first signal conducting portion 1231, the second signal conducting portion 1232, the first ground conducting portion 1233, the first conductor 1241, and the second conductor 1242 are connected to each other, causing the resonator 1210 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1250 is inserted into an intermediate portion of the first transmission line. In the example in FIG. 12B, the capacitor 1250 is inserted into a space between the first signal conducting portion 1231 and the second signal conducting portion 1232. The capacitor 1250 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1250 inserted into the first transmission line may cause the resonator 1210 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 1250 is a lumped element capacitor and a capacitance of the capacitor 1250 is appropriately determined, the resonator 1210 may have a characteristic of a metamaterial. If the resonator 1210 is caused to have a negative magnetic permeability by appropriately adjusting the capacitance of the capacitor 1250, the resonator 1210 may also be referred to as an MNG resonator. Various criteria may be applied to determine the capacitance of the capacitor 1250. For example, the various criteria may include a criterion for enabling the resonator 1210 to have the characteristic of the metamaterial, a criterion for enabling the resonator 1210 to have a negative magnetic permeability at a target frequency, a criterion for enabling the resonator 1210 to have a zeroth order resonance characteristic at the target frequency, and any other suitable criterion. Based on any one or any combination of the aforementioned criteria, the capacitance of the capacitor 1250 may be appropriately determined.

The resonator 1210, hereinafter referred to as the MNG resonator 1210, may have a zeroth order resonance characteristic of having a resonance frequency when a propagation constant is "0". If the MNG resonator 1210 has the zeroth order resonance characteristic, the resonance frequency is independent of a physical size of the MNG resonator 1210. By changing the capacitance of the capacitor 1250, the resonance frequency of the MNG resonator 1210 may be changed without changing the physical size of the MNG resonator 1210.

In a near field, the electric field is concentrated in the capacitor 1250 inserted into the first transmission line, causing the magnetic field to become dominant in the near field. The MNG resonator 1210 has a relatively high Q-factor when the capacitor 1250 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 12B, a magnetic core passing through the MNG resonator 1210 may be provided to increase a power transmission distance.

Referring to FIG. 12B, the feeder 1220 includes a second transmission line (not identified by a reference numeral in FIG. 12B, but formed by various elements in FIG. 12B as discussed below), a third conductor 1271, a fourth conductor 1272, a fifth conductor 1281, and a sixth conductor 1282.

The second transmission line includes a third signal conducting portion 1261 and a fourth signal conducting portion 1262 in an upper portion of the second transmission line, and includes a second ground conducting portion 1263 in a lower portion of the second transmission line. The third signal conducting portion 1261 and the fourth signal conducting portion 1262 are disposed to face the second ground conducting portion 1263. A current flows through the third signal conducting portion 1261 and the fourth signal conducting portion 1262.

One end of the third signal conducting portion 1261 is connected to one end of the third conductor 1271, the other end of the third signal conducting portion 1261 is connected to one end of the fifth conductor 1281, and the other end of the third conductor 1271 is connected to one end of the second ground conducting portion 1263. One end of the fourth signal conducting portion 1262 is connected to one end of the fourth conductor 1272, the other end of the fourth signal conducting portion 1262 is connected to one end the sixth conductor 1282, and the other end of the fourth conductor 1272 is connected to the other end of the second ground conducting portion 1263. The other end of the fifth conductor 1281 is connected to the first signal conducting portion 1231 at or near where the first signal conducting portion 1231 is connected to one end of the capacitor 1250, and the other end of the sixth conductor 1282 is connected to the second signal conducting portion 1232 at or near where the second signal conducting portion 1232 is connected to the other end of the capacitor 1250. Thus, the fifth conductor 1281 and the sixth conductor 1282 are connected in parallel to both ends of the capacitor 1250. The fifth conductor 1281 and the sixth conductor 1282 are used as an input port to receive an RF signal as an input.

Accordingly, the third signal conducting portion 1261, the fourth signal conducting portion 1262, the second ground conducting portion 1263, the third conductor 1271, the fourth conductor 1272, the fifth conductor 1281, the sixth conductor 1282, and the resonator 1210 are connected to each other, causing the resonator 1210 and the feeder 1220 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 1281 or the sixth conductor 1282, input current flows through the feeder 1220 and the resonator 1210, generating a magnetic field that induces a current in the resonator 1210. A direction of the input current flowing through the feeder 1220 is identical to a direction of the induced current flowing through the resonator 1210, thereby causing a strength of a total magnetic field to increase in the center of the resonator 1210, and decrease near the outer periphery of the resonator 1210.

An input impedance is determined by an area of a region between the resonator 1210 and the feeder 1220. Accordingly, a separate matching network used to match the input impedance to an output impedance of a power amplifier may not be necessary. However, if a matching network is used, the input impedance may be adjusted by adjusting a size of the feeder 1220, and accordingly a structure of the matching network may be simplified. The simplified structure of the matching network may reduce a matching loss of the matching network.

The second transmission line, the third conductor 1271, the fourth conductor 1272, the fifth conductor 1281, and the sixth conductor 1282 of the feeder 1220 may have a structure identical to the structure of the resonator 1210. For example, if the resonator 1210 has a loop structure, the feeder 1220 may also have a loop structure. As another example, if the resonator 1210 has a circular structure, the feeder 1220 may also have a circular structure.

Figure 13A:
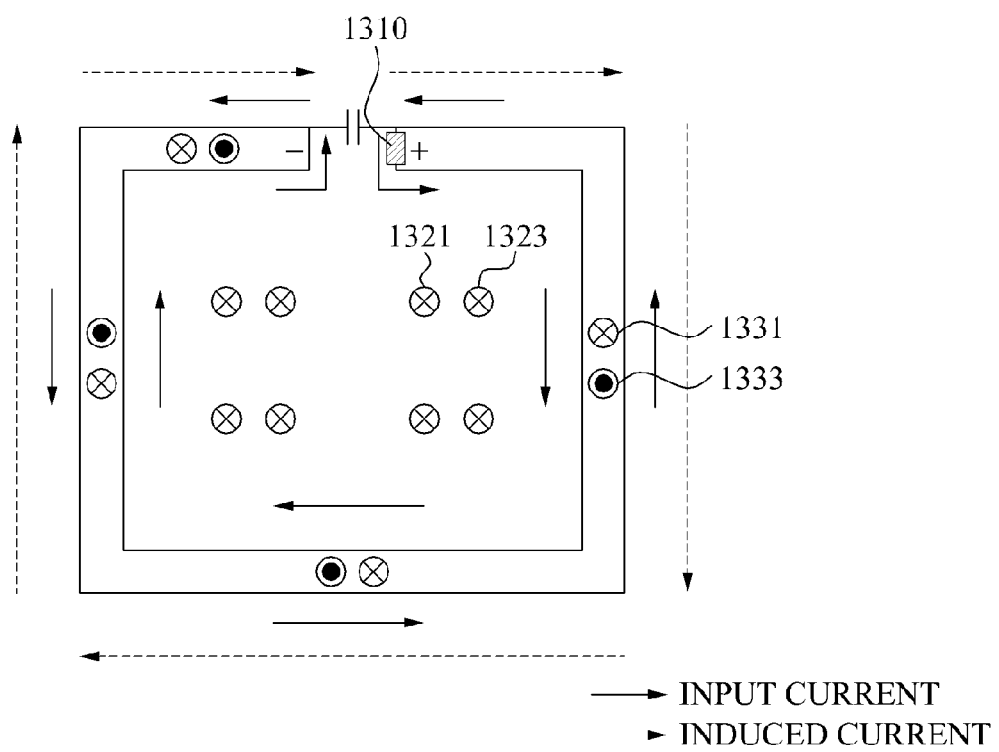
FIG. 13A is a diagram illustrating an example of a distribution of a magnetic field in a resonator that is produced by feeding of a feeder, of a wireless power transmitter.

FIG. 13A is a diagram illustrating an example of a distribution of a magnetic field in a resonator that is produced by feeding of a feeder, of a wireless power transmitter. FIG. 13A more simply illustrates the resonator 1210 and the feeder 1220 of FIGS. 12A and 12B, and the names of the various elements in FIG. 12B will be used in the following description of FIG. 13A without reference numerals.

A feeding operation may be an operation of supplying power to a source resonator in wireless power transmission, or an operation of supplying AC power to a rectification unit in wireless power transmission. FIG. 13A illustrates a direction of input current flowing in the feeder, and a direction of induced current flowing in the source resonator. Additionally, FIG. 13A illustrates a direction of a magnetic field formed by the input current of the feeder, and a direction of a magnetic field formed by the induced current of the source resonator.

Referring to FIG. 13A, the fifth conductor or the sixth conductor of the feeder 1220 may be used as an input port 1310. In FIG. 13A, the sixth conductor of the feeder is being used as the input port 1310. An RF signal is input to the input port 1310. The RF signal may be output from a power amplifier. The power amplifier may increase and decrease an amplitude of the RF signal based on a power requirement of a target device. The RF signal input to the input port 1310 is represented in FIG. 13A as an input current flowing in the feeder. The input current flows in a clockwise direction in the feeder along the second transmission line of the feeder. The fifth conductor and the sixth conductor of the feeder are electrically connected to the resonator. More specifically, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 13A, the input current flowing in the feeder and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 13A, within the feeder, a direction 1321 of the magnetic field generated by the input current flowing in the feeder is identical to a direction 1323 of the magnetic field generated by the induced current flowing in the resonator. Accordingly, a strength of the total magnetic field may increases inside the feeder.

In contrast, as illustrated in FIG. 13A, in a region between the feeder and the resonator, a direction 1333 of the magnetic field generated by the input current flowing in the feeder is opposite to a direction 1331 of the magnetic field generated by the induced current flowing in the source resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 13A, since the feeder is electrically connected to both ends of the capacitor of the resonator, the direction of the induced current in the resonator is identical to the direction of the input current in the feeder. Since the direction of the induced current in the resonator is identical to the direction of the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 13B:
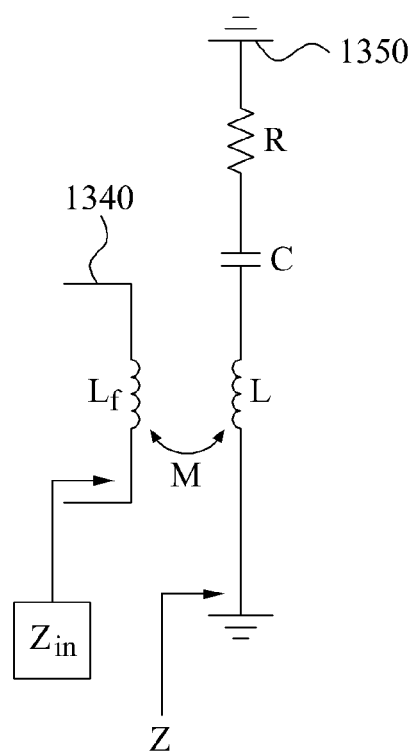
FIG. 13B is a diagram illustrating examples of equivalent circuits of a feeder and a resonator of a wireless power transmitter.

FIG. 13B is a diagram illustrating examples of equivalent circuits of a feeder and a resonator of a wireless power transmitter. Referring to FIG. 13B, a feeder 1340 and a resonator 1350 may be represented by the equivalent circuits in FIG. 13B. The feeder 1340 is represented as an inductor having an inductance $L_f$, and the resonator 1350 is represented as a series connection of an inductor having an inductance L coupled to the inductance $L_f$ of the feeder 1340 by a mutual inductance M, a capacitor having a capacitance C, and a resistor having a resistance R. An example of an input impedance $Z_{in}$ viewed in a direction from the feeder 1340 to the resonator 1350 may be expressed by the following Equation 1:

$$Z_{in} = \frac{(\omega M)^2}{Z} \quad (1)$$

In Equation 1, M denotes a mutual inductance between the feeder 1340 and the resonator 1350, ω denotes a resonance frequency of the feeder 1340 and the resonator 1350, and Z denotes an impedance viewed in a direction from the resonator 1350 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 1340 and the resonator 1350. The area of the region between the feeder 1340 and the resonator 1350 may be adjusted by adjusting a size of the feeder 1340, thereby adjusting the mutual inductance M and the input impedance $Z_{in}$. Since the input impedance $Z_{in}$ may be adjusted by adjusting the size of the feeder 1340, it may be unnecessary to use a separate matching network to perform impedance matching with an output impedance of a power amplifier.

In a target resonator and a feeder included in a wireless power receiver, a magnetic field may be distributed as illustrated in FIG. 13A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 13A, a direction of the induced current flowing in the target resonator will be identical to a direction of the induced current flowing in the feeder. Accordingly, for the reasons discussed above in connection with FIG. 13A, a strength of the total magnetic field will increase inside the feeder, and will decrease in a region between the feeder and the target resonator.

Figure 14:
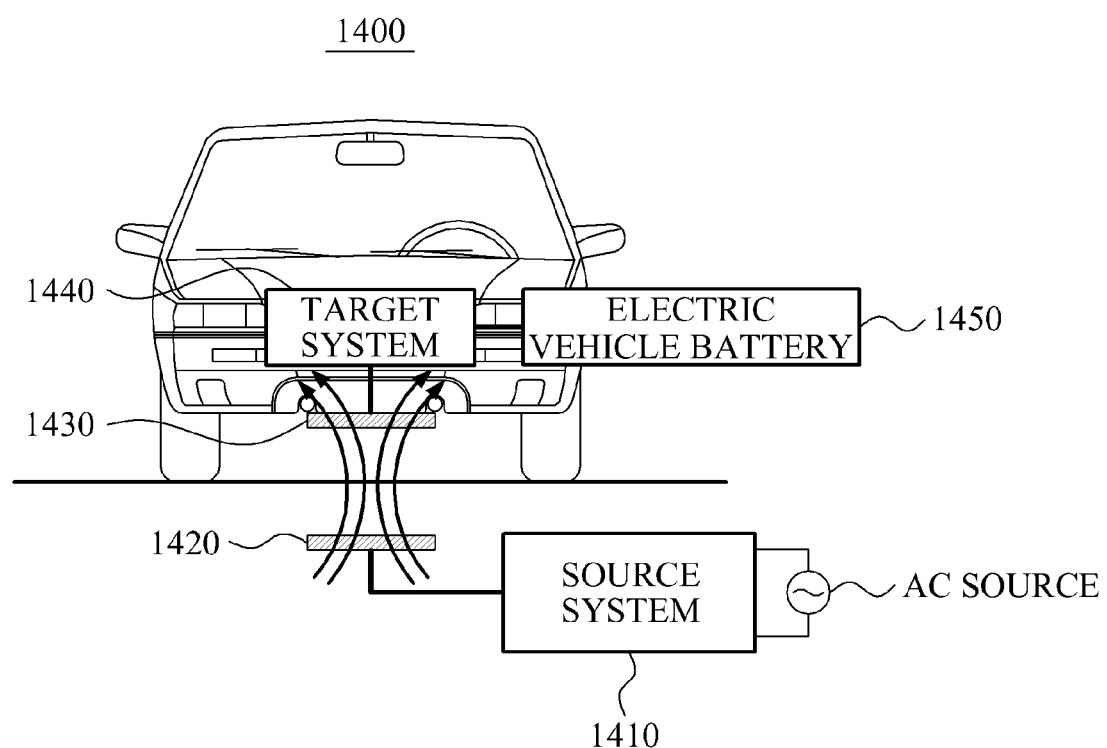
FIG. 14 illustrates an example of an electric vehicle charging system.

FIG. 14 illustrates an example of an electric vehicle charging system. Referring to FIG. 14, an electric vehicle charging system 1400 includes a source system 1410, a source resonator 1420, a target resonator 1430, a target system 1440, and an electric vehicle battery 1450.

In one example, the electric vehicle charging system 1400 has a structure similar to the structure of the wireless power transmission system of FIG. 1. The source system 1410 and the source resonator 1420 in the electric vehicle charging system 1400 operate as a source. The target resonator 1430 and the target system 1440 in the electric vehicle charging system 1400 operate as a target.

In one example, the source system 1410 includes an alternating current-to-direct current (AC/DC) converter, a power detector, a power converter, a control and communication (control/communication) unit similar to those of the source device 110 of FIG. 1. In one example, the target system 1440 includes a rectification unit, a DC-to-DC (DC/DC) converter, a switch unit, a charging unit, and a control/communication unit similar to those of the target device 120 of FIG. 1. The electric vehicle battery 1450 is charged by the target system 1440. The electric vehicle charging system 1400 may use a resonant frequency in a band of a few kHz to tens of MHz.

The source system 1410 generates power based on a type of the vehicle being charged, a capacity of the electric vehicle battery 1450, and a charging state of the electric vehicle battery 1450, and wirelessly transmits the generated power to the target system 1440 via a magnetic coupling between the source resonator 1420 and the target resonator 1430.

The source system 1410 may control an alignment of the source resonator 1420 and the target resonator 1430. For example, when the source resonator 1420 and the target resonator 1430 are not aligned, the controller of the source system 1410 may transmit a message to the target system 1440 to control the alignment of the source resonator 1420 and the target resonator 1430.

For example, when the target resonator 1430 is not located in a position enabling maximum magnetic coupling, the source resonator 1420 and the target resonator 1430 are not properly aligned. When a vehicle does not stop at a proper position to accurately align the source resonator 1420 and the target resonator 1430, the source system 1410 may instruct a position of the vehicle to be adjusted to control the source resonator 1420 and the target resonator 1430 to be aligned. However, this is just an example, and other methods of aligning the source resonator 1420 and the target resonator 1430 may be used.

The source system 1410 and the target system 1440 may transmit or receive an ID of a vehicle and exchange various messages by performing communication with each other.

The descriptions of FIGS. 2 through 13B are also applicable to the electric vehicle charging system 1400. However, the electric vehicle charging system 1400 may use a resonant frequency in a band of a few kHz to tens of MHz, and may wirelessly transmit power that is equal to or higher than tens of watts to charge the electric vehicle battery 1450.

According to the teachings above, there is provided a source device and a method for controlling a magnetic field using two source resonators in a wireless power transmission system. The source device determines a shape of a magnetic field formed by the two source resonators, and changes a phase of at least one of the two source resonators to form the magnetic field in the determined shape. The shape of the magnetic field is determined based on a number of the target devices and positions of the target devices to optimize transmission rates between the source device and the target devices. Also, when a device that may influence the magnetic field is around the source device, the source device forms the magnetic field to avoid the device.

The units described herein may be implemented using hardware components, software components, or a combination thereof. For example, the hardware components may include microphones, amplifiers, band-pass filters, audio to digital convertors, and processing devices. In this example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device used is described as being singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments of accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/ personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A source device configured to control a magnetic field, the source device comprising:
   a plurality of source resonators configured to form the magnetic field to transmit power to one or more target devices;
   a processor configured to
      verify a number of the one or more target devices and position of the one or more target devices, and
      determine a shape of the magnetic field in predetermined shapes of the magnetic field based on the number of the one or more target devices and the position of the one or more target devices to optimize transmission rates between the source device and the one or target devices; and
   a phase changing unit configured to change a phase of at least one of the plurality of source resonators to form the magnetic field in the determined shape.

2. The source device of claim 1, wherein the processor is further configured to:
   determine the shape of the magnetic field based on a user request.

3. The source device of claim 1, wherein the phase changing unit is further configured to:
   set a phase difference between the plurality of source resonators to zero degrees in response to the determined shape corresponding to a shape in which a magnitude of the magnetic field between the plurality of source resonators is at a maximum.

4. The source device of claim 1, wherein the phase changing unit is further configured to:
   set a phase difference between the plurality of source resonators to 180 degrees in response to the determined shape corresponding to a shape in which a magnitude of the magnetic field between the plurality of source resonators is at a minimum and a magnitude of the magnetic field outside of the plurality of source resonators is relatively large.

5. The source device of claim 1, wherein the phase changing unit is further configured to:
   set a phase difference between the plurality of source resonators to be between zero degrees and 180 degrees based on the determined shape.

6. The source device of claim 1, wherein the phase changing unit is further configured to:
   delay transfer of a current to be input into the at least one of the plurality of source resonators to change the phase.

7. A method of controlling, by a source device, a magnetic field, the method comprising:
   verifying a number of one or more target devices to which power is to be transmitted, and position of the one or more target devices;
   determining a shape of the magnetic field in predetermined shapes of the magnetic field to be formed by source resonators to transmit power to the one or more target devices based on the number of the one or more target devices and the position of the one or more target devices to optimize transmission rates between the source device and the one or more target devices; and
   changing a phase of at least one of the source resonators to form the magnetic field in the determined shape.

8. The method of claim 7, wherein the determining comprises:
   determining the shape of the magnetic field based on a user request.

9. The method of claim 7, wherein the changing comprises:
   setting a phase difference between the source resonators to zero degrees in response to the determined shape corresponding to a shape in which a magnitude of the magnetic field between the source resonators is at a maximum.

10. The method of claim 7, wherein the changing comprises:
    setting a phase difference between the source resonators to 180 degrees in response to the determined shape corresponding to a shape in which a magnitude of the magnetic field between the resonators is at a minimum and a magnitude of the magnetic field outside of the source resonators is relatively large.

11. The method of claim 7, wherein the changing comprises:
    setting a phase difference between the source resonators to be between zero degrees and 180 degrees based on the determined shape.

12. The method of claim 7, wherein the changing comprises:
    delaying transfer of a current to be input into the at least one of the source resonators to change the phase.

13. A non-transitory computer-readable storage medium storing a program comprising instructions to cause a computer to perform the method of claim 7.

14. An electric vehicle comprising:
    a plurality of source resonators configured to form a magnetic field to transmit power to one or more target devices;
    a processor configured to verify a number of the one or more target devices and position of the one or more target devices, and
    determine a shape of the magnetic field in predetermined shapes of the magnetic field based on the number of the one or more target devices and the position of the one or more target devices to optimize transmission rates between the electric vehicle and the one or more target devices; and
    a phase changing unit configured to change a phase of at least one of the plurality of source resonators to form the magnetic field in the determined shape.

* * * * *